Figure 1:
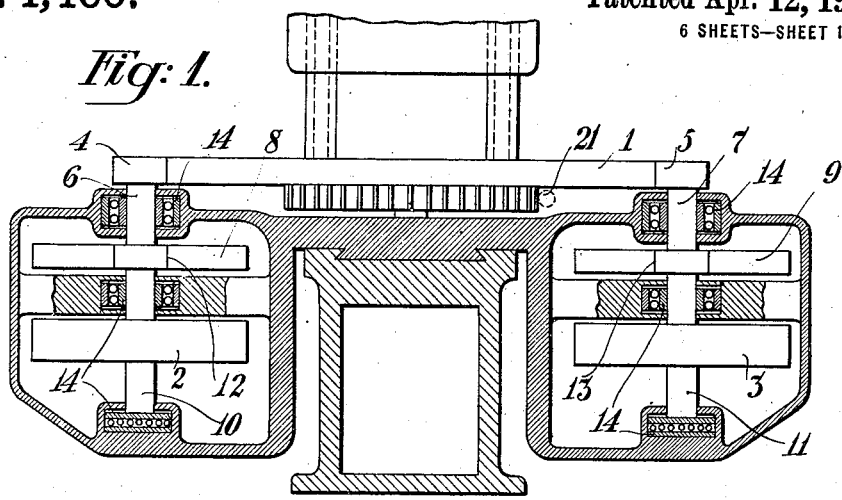

F. LJUNGSTRÖM.
GEAR CUTTING MACHINE.
APPLICATION FILED MAY 8, 1920.

1,374,460.

Patented Apr. 12, 1921.
6 SHEETS—SHEET 1.

Inventor
F. Ljungström
By H. R. Kerslake
Attorney

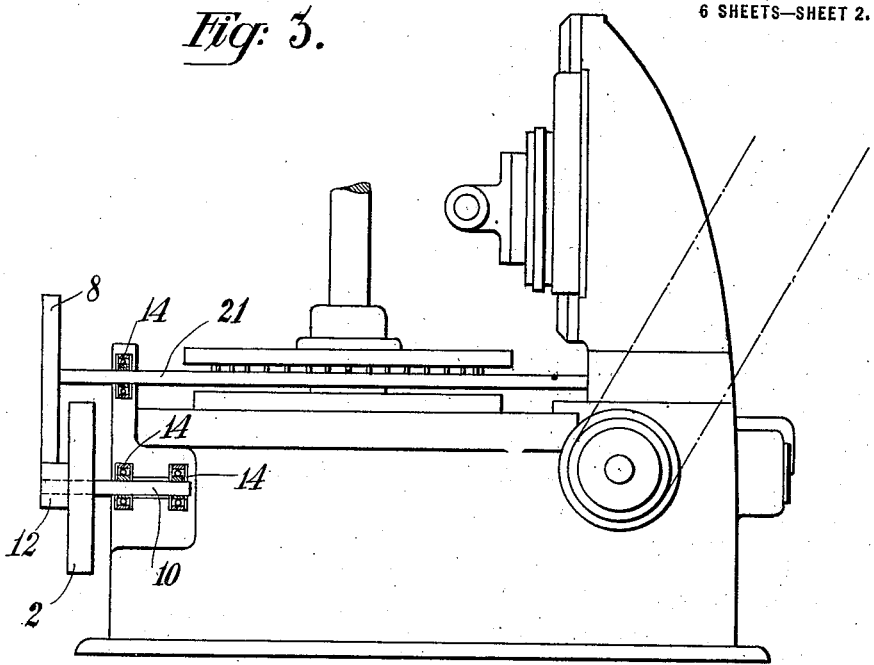
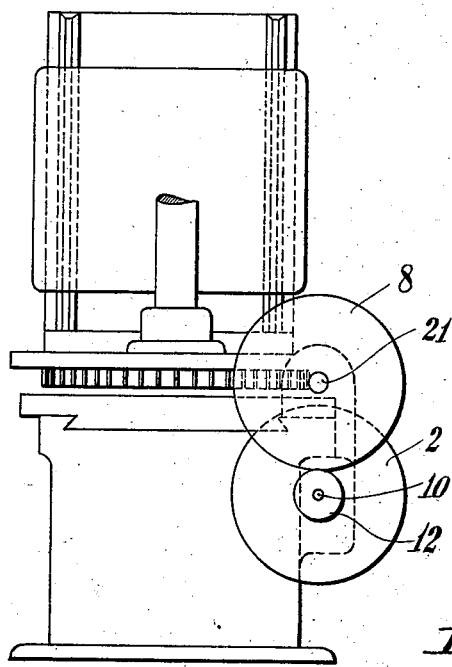

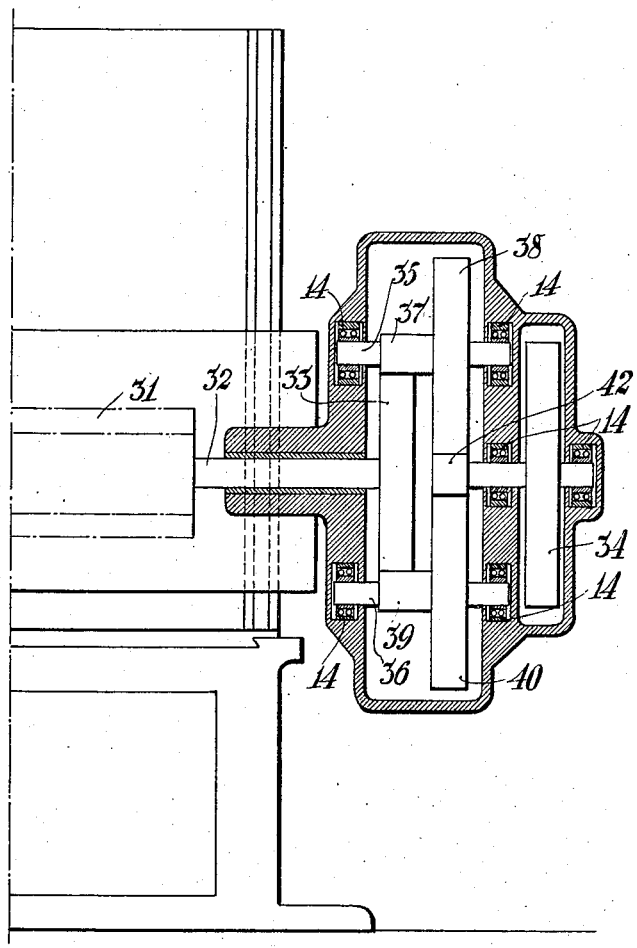

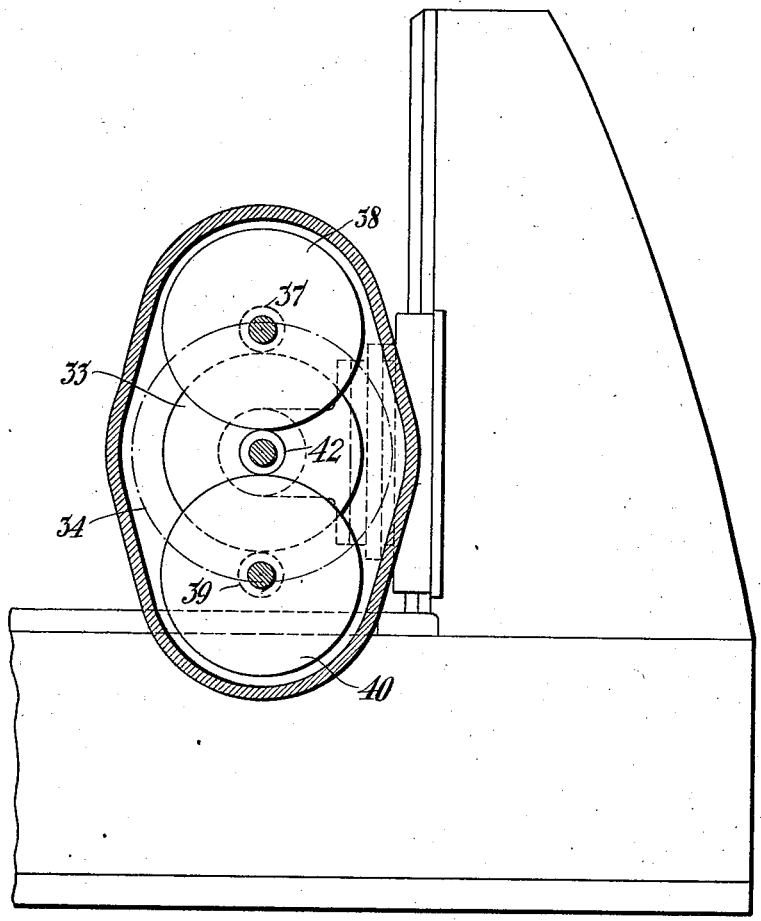

UNITED STATES PATENT OFFICE.

FREDRIK LJUNGSTRÖM, OF BREVIK, LIDINGÖN, SWEDEN, ASSIGNOR TO AKTIEBOLAGET LJUNGSTROM ANGTURBIN, OF STOCKHOLM, SWEDEN, A CORPORATION.

GEAR-CUTTING MACHINE.

1,374,460.  Specification of Letters Patent.  Patented Apr. 12, 1921.

Application filed May 8, 1920. Serial No. 379,897.

*To all whom it may concern:*

Be it known that I, FREDRIK LJUNGSTRÖM, chief engineer, subject of the King of Sweden, residing at Brevik, Lidingön, Sweden, have invented certain new and useful Improvements in Gear-Cutting Machines, of which the following is a specification.

The present invention relates to improvements in gear cutting machines and its object is to produce more accurate work and secure uniform movement of the various rotating parts of the machine.

Owing to defects in the gear cutting machines as heretofore used certain errors are apt to occur in milling the gear teeth, some of which errors are produced by defective gears, etc., constituting parts of the machine, whereas other errors are caused by the rotating table lacking an angular velocity of mathematical constancy relatively to the angular velocity of the remaining parts, for instance that of the cutter arbor. Both these reasons may coact, or they may be independent of each other, and they result in irregularities of the form of the teeth and tooth spaces. Supposing that the rotating table is driven by means of a toothed gearing, one of the gears being defective, so that a tooth engages the following gear too soon, this will result in an increased angular velocity of the table, and, consequently, a faulty or a misplaced tooth is produced by the machine.

The present invention has for its purpose to obviate these drawbacks, and consists in connecting the rotating table, the cutter arbor or other moving parts of the gear cutting machine to a gyrating mass, for instance a fly-wheel, by means of a friction gearing. In such an arrangement, the high-speed parts of the friction gearing may have a separate driving means. In this way a constant angular velocity of the table is enforced, the movement of the table being dependent on a gyrating mass connected thereto, such gyrating mass evidently tending to retain a constant angular velocity. If the cutter arbor or other movable parts are also connected to the gyrating mass, said parts will also obtain the same angular velocities with substantially mathematical exactness, and thus the gear cutting machine will produce teeth which are substantially mathematically correct. Then the rotating parts connected with a gyrating mass will not always have the angular velocity which the driving means tends to impart thereto. This difference in speed is evidenced by an increased pressure on the defective parts of the gear cutting machine, which admits of the right speed through the resiliency thereof. In this way the gear cutting machine will act very exactly owing to the mutual wearing and grinding action effected by its several members.

By the employment of gear wheels, produced in a gear cutting machine according to the invention, in other gear cutting machine according to the invention, the final result will obviously be still better, and in this way teeth will finally be obtained which are of an absolute mathematical exactness.

The movable parts of the machine should not be connected with a gyrating mass by means of a toothed gearing, as errors occurring in the gear wheels would then result in non-uniformity of the tooth-shapes in the work-piece. This is particularly applicable to those parts of the gearing of the fly-wheel which are driven at the lowest speed. However, the high-speed part of the gearing may consist of gear wheels, as a fault in the same is not very perceptible, one wheel, perhaps, making one or more revolutions each time a tooth of the work-piece is going past the cutter.

Consequently, the rotating parts of the gear cutting machine should be connected wholly or partly with the gyrating mass by means of friction-gearings comprising cylindrical or conical wheels or rollers rolling on each other. Rollers or wheels which are mathematically correct may be easily procured, and thus a gearing of the said type may be regarded as being free from defects.

Figure 7:
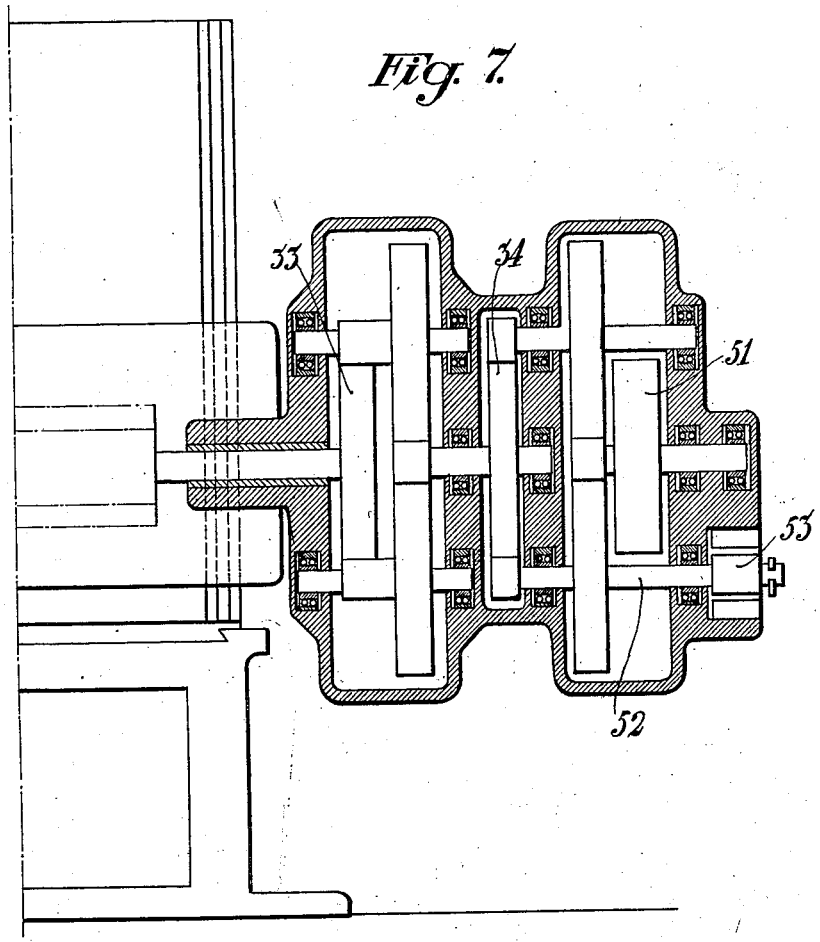
Figure 8:
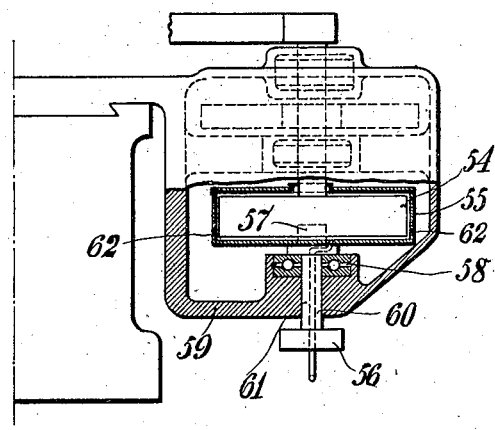

In the accompanying drawings, four embodiments of the invention are shown by way of example in Figures 1 and 2, 3 and 4, 5 and 6 and in Fig. 7 respectively, Fig. 8 being a diagrammatical illustration of one form of a detail arrangement.

Figure 2:
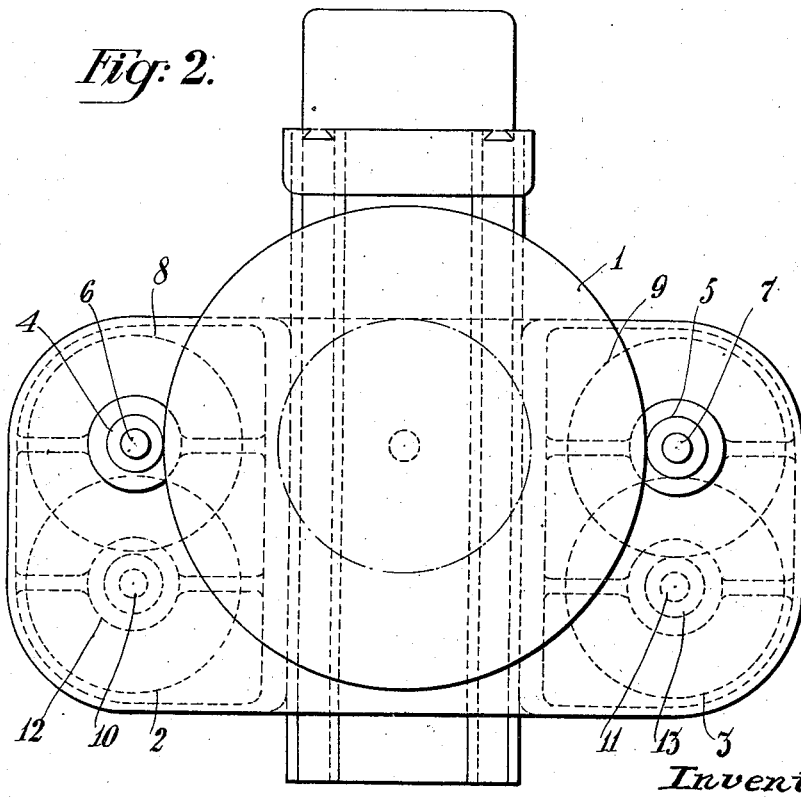

Figs. 1 and 2 show an embodiment in which the table is connected to two fly-wheels 2 and 3 by means of a friction-gearing, the said fly-wheels being located on either side of the table. The periphery of the latter is provided with a roughened or friction surface, so as to drive the rollers 4 and 5 attached to the same shafts 6 and 7 as the larger friction wheels 8 and 9 which in turn drive the rollers 12 and 13 secured to the fly-wheel shafts 10 and 11. Consequently, the motion of the table depends on the movements of the balance wheels 2 and 3. Preferably, the friction-gearing is mounted in ball bearings 14 so as to reduce the power consumed for driving the gearing. The table 1 is driven in known manner by means of a worm 21 and a worm wheel.

In the embodiment according to Figs. 3 and 4, the worm 21 serving to drive the table is connected with the fly-wheel 2. This spindle has a greater speed of rotation than the table, and thus a smaller ratio of gearing may be selected than in the embodiment according to Figs. 1 and 2, in order to obtain a sufficient energy of movement in the fly-wheel 2. The spindle 21 is provided at one end with a friction wheel 8 driving the smaller roller 12 secured to the same shaft 10 as the fly-wheel 2. The fly-wheel, which attains a comparatively high speed and has a constant angular velocity, consequently imparts a constant angular velocity to the screw-spindle. In case the speed of the table is also maintained constant, as shown in Figs. 1 and 2, the worm and worm-wheel will gradually obtain a constant speed owing to the mutual grinding and wearing action effected by said members.

Figs. 5 and 6 also illustrate an embodiment in which the cutter arbor is connected with a fly-wheel. The shaft 32, to which the cutter 31 is secured, is provided for instance at one end or both ends with a friction wheel 33 which in this case preferably transmits the motion to the fly-wheel 34 by means of two parallel intermediate shafts 35 and 36 which are also provided with friction wheels 37 and 38, and 39 and 40, wheels 37 and 39 being of a smaller size and running in contact with the wheel 33 attached to the spindle 32. The two larger wheels 38 and 40 drive the same roller 42 on the fly-wheel shaft 41. The friction gearing is preferably mounted in ball-bearings 14. In this way, the cutter is also compelled to assume a constant angular velocity. In case the table and, perhaps, other movable parts were compelled to assume a constant angular velocity, by means of fly-wheels according to Figs. 1 and 2, and if the cutter were correct, the teeth produced would be substantially mathematically exact. On account of the construction and the movement of the cutter, a slight error in it will be gradually eliminated, and by reason of this a gear wheel cut in a machine according to the invention will be substantially accurate.

Obviously, the fly-wheel may be stepped up to a much greater speed; an embodiment of this character is shown in Fig. 7. Here the wheel 34, which in the embodiment according to Figs. 5 and 6 served as a balance wheel, is arranged as a wheel in the gearing and connected with the balance wheel 51 in the same manner as the wheel 33 is connected with the balance wheel 34 in Figs. 5 and 6. To reduce the power taken from the cutter arbor to drive the gearing and the balance wheel, an intermediate shaft in the gearing may be preferably provided with another driving device. In this embodiment, the intermediate shaft 52 is connected directly to an electric motor 53. The last part of the gearing may without inconvenience consist of gear wheels, but in such case these gear wheels will have to be as faultless as possible. In this case, too, the gearing should be mounted in ball-bearings, in order that the power consumption will be as small as possible.

Fig. 8 shows an embodiment of a starting and driving means for the balance wheel previously denoted by the numeral 3. In this case the arrangement consists of a balance wheel 54 surrounded by a rotating casing 55 driven by a separate motor or by means of a pulley 56. The balance wheel is preferably mounted in the casing by means of a thrust bearing 57, and the casing is supported by the bearing 58 in the frame 59. The casing is provided with a shaft 60 connected to any driving motor. When starting the equalizer, the casing is brought in motion simultaneously as a liquid, for instance oil, is pressed into the casing through the inlet channel 61 in the shaft 60. This inlet channel 61 must be so dimensioned as to permit of more oil being forced therethrough than emitted through the apertures 62 in the casing 55. In this way a soft starting of the balance wheel 54 is obtained. As soon as the balance wheel has attained the desired speed, the inlet channel 61 is shut off so that the liquid will flow out of the casing through the apertures 62 and an air stratum be produced between the inner walls of the casing and the balance wheel. This stratum has the same properties as the oil, but, in a lesser degree, the friction thereof tending to keep the casing and the balance wheel at the same speeds. Thus, the casing is driven at nearly the same speed as the balance wheel by means of the driving motor, and is conducive to the retainment of a constant speed of the balance wheel.

As evidently the movable parts of the gear cutting machine will in this way gradually obtain a constant speed owing to the mutual grinding and wearing action effected by said members, the said machine consequently acquires ever increasing accuracy when in use.

What I claim as new and desire to secure by Letters Patent of the United States is:—

1. In a gear cutting machine, the combination with the operating mechanism and a gyrating mass, of a connection between the operating mechanism and said mass consisting of a friction gearing adapted to transmit an increased speed to said connection and mass.

2. A combination as defined in claim 1, in which the parts of the gearing possessing the increased speed are connected with separate driving means.

In testimony whereof I affix my signature in presence of two witnesses.

FREDRIK LJUNGSTRÖM.

Witnesses:
O. H. BERGROLK,
INEZ BONESSON.